Nov. 1, 1960 A. F. ANDERSON 2,958,136
DIRECT READING MICROMETER GAGE AND ATTACHMENT THEREFOR
Filed Feb. 4, 1958
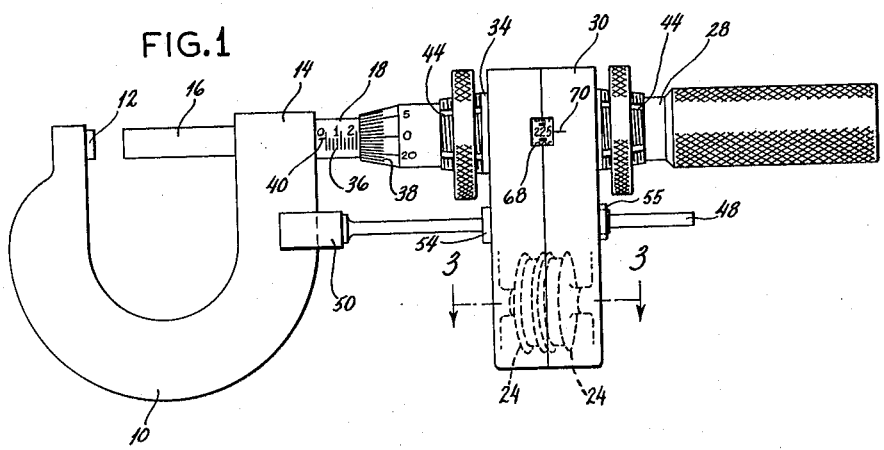
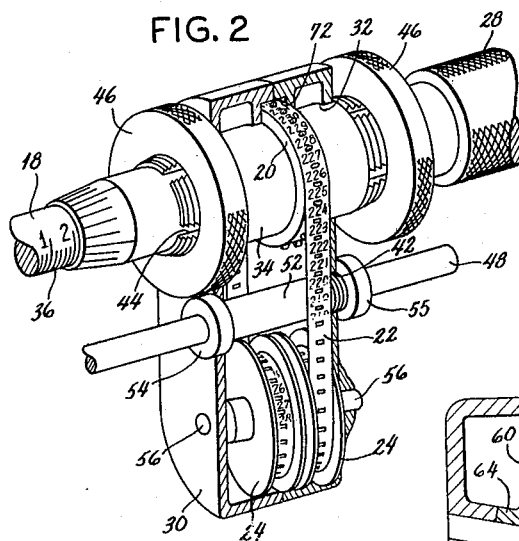
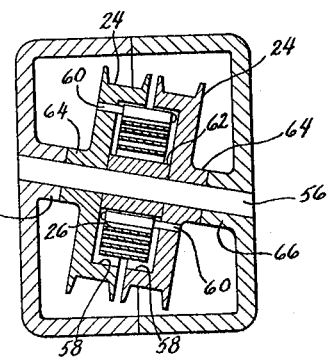
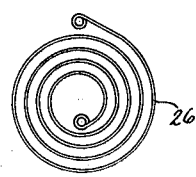
INVENTOR.
ALFRED F. ANDERSON
BY Teller & McCormick
ATTORNEYS

United States Patent Office 2,958,136
Patented Nov. 1, 1960

2,958,136

DIRECT READING MICROMETER GAGE AND ATTACHMENT THEREFOR

Alfred F. Anderson, 919 Forbes St., East Hartford, Conn.

Filed Feb. 4, 1958, Ser. No. 713,145

5 Claims. (Cl. 33—166)

This invention relates to micrometer gages and, more particularly, to a micrometer gage of the direct reading type.

An object of the invention is to provide an improved direct reading micrometer gage which is simple in design, economical of manufacture and reliable and accurate in use.

A further object of the invention is to provide apparatus in the form of an attachment which may be connected to an existing micrometer gage which apparatus is adapted to provide direct readings of measurement of said gage.

A more specific object of the invention is to provide apparatus of the type described in the last above paragraph which may be pre-assembled as a self-contained unit and readily connected to an existing micrometer gage of conventional construction.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

Fig. 1 is a side view of a micrometer gage embodying the invention;

Fig. 2 is an enlarged perspective view, partially in section, of a portion of the micrometer gage illustrated in Fig. 1;

Fig. 3 is a sectional view of a portion of the construction illustrated in Fig. 1, taken substantially along the line 3—3 thereof, the marked tape being removed for clarity of illustration; and Fig. 4 is a side elevational view of a spiral spring illustrated in section in Fig. 3.

Referring particularly to Fig. 1 of the drawing, it will be seen that the micrometer gage there illustrated includes a frame 10 which, in accordance with conventional practice, is generally U-shaped. At one end of the frame, an anvil 12 is provided and the opposite end thereof constitutes a support and a bearing guide 14 for a longitudinally movable spindle 16. The support 14 has attached thereto a barrel 18 which is threaded internally and through which extends the spindle 16 which is provided over a portion of its length with mating external threads.

A sprocket wheel 20 is provided which is concentric with the spindle 16 and is connected for rotation therewith. Said wheel 20 is located within a housing 30 which may be widely varied, one form of housing being shown in the drawing and being hereafter described in detail. Two take-up pulleys 24, 24 are located within the housing 30 and they are rotatable about a common axis which is spaced from the axis of the spindle and is in fixed relation to said housing. Said pulleys 24, 24 are rotatable independently of each other and each of them is free to make more than one rotation. A flat perforated tape 22 extends over said sprocket wheel 20 and is engaged therewith so as to be carried thereover by rotation thereof with said spindle. The tape 22 is preferably a flexible thin flat metal band which is resistant to stretching and said tape is provided with markings indicating units of measurement of the micrometer gage. Said tape extends from said sprocket wheels to said take-up pulleys and it has its end portions coiled respectively on said pulleys in opposite directions. A single spring 26 is bodily rotatable about the axis of the pulleys and has its ends connected respectively with said pulleys so as to tend to rotate them in winding directions. Upon rotation of either pulley by one portion of said tape in the unwinding direction said spring 26 serves to rotate the other pulley in the same direction to effect winding of the other portion of said tape thereon. Said spring 26 further serves during winding to rotate said other pulley at speeds varying from those of the first said pulley to compensate for varying differences in the unwinding and winding radii of the coiled portions of said tape on said pulleys. For registering with the markings provided on the tape 22, there is provided a stationary indicator which is positioned adjacent the tape 22 so that the markings thereon register successively with said indicator on rotation of the spindle and pulley whereby to provide direct readings of the micrometer gage.

While the invention in some of its aspects is not so limited, the drawing shows the sprocket wheel 20 as being connected to a conventional thimble 28 which surrounds a portion of the barrel 18 in the usual manner and which extends longitudinally rearwardly therefrom being carried by a rearward portion of the spindle 16 and fixedly connected thereto for rotation and for longitudinal movement therewith. When the thimble 28 is turned, the spindle 16 is rotated therewith and, by reason of the threaded connection of said spindle with the barrel 18, said spindle and thimble are moved longitudinally with respect to said barrel and the forward end of the spindle 16 is thereby positioned in suitably spaced relation with the anvil 12 for measuring a selected workpiece. The sprocket wheel 20 is thus connected with the spindle 16 indirectly rather than directly and, when connection is made in such manner, the said housing 30 is movable relatively to the frame 10 and it has an opening 32 for receiving a portion of the thimble 28. As before stated, said housing also carries the first and second take-up pulleys 24, 24 and encloses the tape 22.

Also provided is means engageable with the thimble 28 and adapted to hold the housing 30 in fixed relationship with the axis of said thimble while permitting free relative rotation of said thimble with respect to said housing and said means may comprise a sleeve 34 adapted for connection to the thimble 28 for rotation therewith and further adapted to be rotatably disposed in the opening 32 in the housing 30 with the sprocket wheel 20 connected thereto for rotation therewith. In addition, housing securing means is provided for preventing rotation of the housing 30 about the axis of the thimble 28 and said means is preferably adapted for connection with the frame 10 of the micrometer gage. Thus, in the preferred embodiment of the invention shown in the drawing, it will be seen that the apparatus is provided in the form of an attachment adapted for ready connection to an existing micrometer gage which apparatus may be assembled as a self-contained unit prior to attachment to a micrometer gage as will be seen more clearly hereinafter.

The micrometer gage shown in the drawing is provided on the barrel 18 and on the thimble 28 thereof with scales adapted to provide readings of measurement of said instrument and such scales are described hereinbelow, it being understood, however, that the function of said scales is accomplished in superior fashion by the aforesaid marked tape and that description thereof is included only with reference to the attachment of direct reading apparatus to an existing micrometer gage previously provided with such scales. A scale 36 is provided on the barrel 18 of the micrometer gage and said scale includes graduations which are numbered from one to ten and these graduations are sub-divided into four spaces, each of which denotes twenty-five one-thousandths (.025) of an inch. The thimble 28 has a graduated scale 38 extending therearound at its forward end and divided into twenty-five spaces, each representing one twenty-fifth of the distance around said thimble. The scale 36 has an index mark 40 and a turn of the thimble 28 from zero to the first graduation mark thereon represents one one-thousandth (.001) of an inch; that is, the end of the spindle 16 will be moved with respect to the anvil 12 the distance of one one-thousandth (.001) of an inch and a full turn of the thimble represents twenty-five one-thousandths (.025) of an inch, moving the thimble 28 along the scale 36 a distance of one graduation thereof and denoting movement of the end of the spindle with respect to the anvil a distance of twenty-five one-thousandths (.025) of an inch.

The housing 30 preferably comprises two parts separated in a plane normal to the axis of the thimble 28 and said parts are adapted for interengagement. Each part of the housing 30 is preferably provided with two openings, said openings being suitably sized and arranged therein so as to cooperate, when the two parts of said housing are interengaged as shown, to provide the aforementioned first opening 32 in said housing adapted to receive a portion of the thimble 28 and to provide a second and smaller opening 42 spaced from said first opening. The aforesaid sleeve 34 which is connectible with the thimble 28 of the micrometer gage and adapted to be rotatably disposed in the housing opening 32 preferably comprises a collet. Accordingly, each end portion of the sleeve 34 is threaded externally and is provided with a plurality of longitudinally extending slots 44, 44. A suitable nut 46 is provided for engagement with each end of the sleeve or collet 34 and said nuts serve, when threaded securely on the ends of said collet, to force said collet into friction-tight engagement with the thimble 28 whereby to provide for rotation and for longitudinal movement of the collet 34 and the nuts 46, 46 with said thimble. When the collet 34 is disposed in the opening 32 of the housing 30 and is engaged, as described, with the thimble 28 of the micrometer gage, the two parts of said housing depend from the collet and are held in interengagement and prevented from rotating with said collet by suitable means as described hereinbelow.

The means for preventing rotation of the housing 30 with the collet 34 about the axis of the thimble 28 comprises, in preferred form, a rod 48 which is connectible at one end thereof to the frame 10 of the micrometer gage. A clamp member 50 is connected to the rod 48 at one end thereof and is adapted for engagement with the frame 10, as by forcing the sides of said member outwardly and sliding same over said frame. The other end of the rod 48 extends longitudinally from the clamp member 50 and is connected to the housing 30. Preferably, the rod 48 extends into the second opening 42 which may be provided in said housing and the portion of said rod extending into said housing may be surrounded by a bushing 52 disposed in said housing opening, the rod 48 being slidably engaged with said bushing.

The bushing 52, in preferred form, is adapted to hold the two parts of the housing 30 in interengagement as well as to slidably receive a portion of the rod 48 and is provided at its ends with radially extending flanges, one of said flanges 54 being integral and the other of said flanges 55 being a nut engaging with threads formed on the end of said bushing 52. When the bushing 52 is disposed in the second housing opening 42 and the nut is engaged with the end of said bushing, the two parts of the housing 30 are thereby held in interengagement as shown in the drawing and, in addition, with the rod 48 extending into said bushing and connected at the other end thereof to the frame 10 of the micrometer gage, the housing 30 is prevented from rotating with the collet 34 but is, however, free to move longitudinally.

The aforesaid main pulley or sprocket wheel 20 is preferably adapted for fixed connection with the collet 34 so as to be connected thereby to the thimble 28 for rotation and for longitudinal movement therewith and said sprocket wheel may be formed integrally with said collet, as shown, or alternatively, the wheel 20 may be connected to the collet 34 by shrink fitting or said wheel may be keyed or welded on said collet. The tape 22 which extends over the sprocket wheel 20 and which is provided with suitable perforations for engaging the sprockets thereof so as to be carried over said wheel by rotation thereof is provided with markings as indicated above and when said tape is to be used with the micrometer gage shown and described above, said markings preferably comprise numbers each denoting one-thousandth of an inch. The numbers read, for example with a one-inch micrometer gage adapted to measure in units of thousandths of an inch, from 0 to 999 and said numbers are equally spaced on the tape 22, the space therebetween being such that the tape will be carried over the sprocket wheel 20 a distance equal to said space by one twenty-fifth of a revolution of the thimble 28 denoting longitudinal movement of the spindle 16 a distance of one-thousandth of an inch. A complete revolution of the thimble 28 will result in movement of the tape 22 over the sprocket wheel 20 a distance of twenty-five of said numbers. It will be understood that while the tape 22 is shown in the drawing and described as being provided with a numbered scale graduated in thousandths of an inch, said scale may be graduated in other decimal parts of an inch or in other units of measurement or decimal parts thereof as required for providing direct readings of measurement of micrometer gages of various types.

The take-up pulleys 24, 24 which are disposed in the housing 30 and adapted to receive and discharge the tape 22 as it is discharged from and supplied to the sprocket wheel 20 are preferably disposed adjacently and in coaxial relation with each other on a supporting rod 56 which may be mounted at each end thereof in the housing 30. The take-up pulleys 24, 24 are freely rotatable on the supporting rod 56 and are rotatable independently of each other and independently of the sprocket wheel 20 except as controlled by the tape 22, the end portions of the tape being coiled respectively on said pulleys in opposite directions. Each of the pulleys is free to make more than one rotation so as to enable the tape to be coiled thereon to any necessary extent.

The aforesaid spring means 26 is bodily rotatable about the axis of the pulleys and it urges the pulleys 24, 24 in suitable rotational directions for maintaining the tape 22 in tension. Said spring 26 is preferably a flat spiral spring, as best illustrated in Fig. 4. To accommodate the spring 26, a coaxial cylindrical cavity 58 having one end open is preferably formed in each of the pulleys 24, 24, said cavities being in facing relation and in communication. The spring 26 is preferably disposed within said cavities and attached at one end thereof to one of the take-up pulleys 24 and at the other end thereof to the other of said take-up pulleys as by the pins 60, 60, said spring being in a slightly flexed condition so as to urge said pulleys in opposite rotational directions. To secure the pulleys 24, 24 in the desired axial position, a bushing 62 may be provided therebetween and a hub 64 formed on each of said pulleys for engaging mating shoulders 66, 66 formed on the housing 30.

In order that the points at which the take-up pulleys 24, 24 discharge the tape 22 to the sprocket wheel 20 and receive said tape therefrom may be aligned with said sprocket wheel so as to allow for proper engagement of the perforations in said tape with the sprockets of said wheel, it has been found desirable to arrange the axis of the pulleys 24, 24 angularly with respect to the axis of said sprocket wheel. Accordingly, the supporting rod 56 for the pulleys 24, 24 is mounted in the housing 30 in a plane substantially normal to the plane separating the two parts of said housing, and said rod is angularly arranged with respect to the axis of the thimble 28, as best illustrated in Fig. 3, so that the tape 22 is twisted as it passes between the sprocket wheel 20 and the take-up pulleys 24, 24, the longitudinal centerline of said tape therebetween remaining, however, substantially within a plane normal to the axis of said sprocket wheel.

The aforesaid stationary indicator provided for registering with the markings on the tape 22 comprises, in the preferred embodiment of the invention, a sight opening 68 provided in the housing 30 and positioned so that the markings on the tape 22 may be readily viewed therethrough. The sight opening 68 may have associated therewith an index mark 70 for facilitating precise readings of the numbers on the tape 22.

Preferably, the housing 30 is provided with means adapted for moving said housing and the take-up pulleys 24, 24 carried thereby longitudinally with the collet 34 and sprocket wheel 20 as said collet and sprocket wheel are moved longitudinally with the thimble 28 on rotation of the latter. Said means preferably comprises an internal recess 72 formed in the housing 30 and adapted to receive a portion of the sprocket wheel 20, the sprocket wheel 20 being freely rotatable within said recess and the sides of said wheel engaging the sides of said recess as required to cause the aforesaid longitudinal movement of said housing.

The manner of assembling the apparatus described above and of connecting same to a micrometer gage, as well as the operation thereof should be apparent from the foregoing and, therefore, only a brief description of the manner in which attachment of the assembled apparatus to a micrometer gage may be accomplished and of operation of the apparatus with said gage is presented hereinbelow. When the apparatus has been assembled as a unit, it may be attached to a micrometer gage by inserting the thimble 28 of the micrometer gage in the collet 34 disposed in the opening 32 in the housing 30 and, by relative endwise movement of said collet and thimble, the apparatus may be located in the desired longitudinal position on said thimble. The collet 34 may then be rotated as required with respect to the thimble 28 and the housing 30 to synchronize the numbers on the tape 22 with the spindle 16 of the micrometer gage whereupon the nuts 46 may be tightened and the clamp member 50 engaged with the frame 10 of the gage.

With the apparatus operatively connected to the micrometer gage as described and with a workpiece to be measured disposed between the spindle and the anvil, the thimble of said gage may be rotated in the normal manner to advance the spindle toward the workpiece. Upon rotation of the thimble 28, the sprocket wheel 20 will be rotated therewith and will carry the numbered tape 22 thereover, said tape being uncoiled from one of the take-up pulleys 24, 24 and coiled up on the other of said take-up pulleys and the numbers on said tape appearing successively through the sight opening 68 in the housing 30. When the spindle has been advanced into contact with the workpiece and the proper tightening torque applied as with a conventional micrometer gage, the number appearing through the sight opening 68 may be read by the operator whereupon he will be directly advised of the number of thousandths of an inch constituting the measured dimension of the workpiece.

The invention claimed is:

1. A direct reading micrometer gage comprising a generally U-shaped frame, a barrel fixedly connected with the frame, a rotatable spindle extending through the barrel and having threaded connection therewith, a housing fixed against rotation with said spindle, a sprocket wheel concentric with the spindle and connected for rotation therewith which wheel is located within said housing, two take-up pulleys located within the housing and rotatable about a common axis which is spaced from the axis of the spindle and is in fixed relation to said housing, said pulleys being rotatable independently of each other and each of them being free to make more than one rotation, a flat perforated tape extending over said sprocket wheel and engaged therewith so as to be carried thereover by rotation thereof with said spindle which tape is provided with a series of markings for indicating units of measurement of said gage, said tape having its end portions coiled respectively on said pulleys in opposite directions, a single spring bodily rotatable about the axis of the pulleys and having its ends connected respectively with pulleys and tending to rotate them in opposite winding directions, said spring upon rotation of either pulley by one portion of said tape in the unwinding direction serving to rotate the other pulley in the same direction to effect winding of the other portion of said tape thereon and further serving to rotate said other pulley at speeds varying from those of the first said pulley to compensate for varying differences in the unwinding and winding radii of the coiled portions of said tape on said pulleys, and a stationary indicator on the housing adjacent the tape so that the markings on the tape register successively therewith to provide direct readings of said micrometer gage.

2. A direct reading micrometer as set forth in claim 1, wherein the axis of rotation of said take-up pulleys is at an angle to a plane through the spindle axis so that the center lines of the tape between said sprocket wheel and said pulleys are approximately in a plane perpendicular to the spindle axis and extending through the center of said sprocket wheel.

3. For use with a micrometer gage including a frame and a fixed barrel and a rotatable spindle partly within the barrel and having threaded connection therewith and a rotatable thimble carried by the spindle and surrounding a portion of the barrel, an attachment comprising in combination, a housing separate from said frame and thimble and having first and second openings therein, a sleeve disposed in said first housing opening for free rotation therewithin which sleeve is fixedly connectible with said thimble for rotation and for longitudinal movement therewith, a sprocket wheel disposed within said housing and connected to said sleeve for rotation and for longitudinal movement therewith, means on said housing engaging one of said longitudinally movable parts for moving said housing longitudinally therewith, a rod fixedly connectible at one end thereof to said frame and extending into said second housing opening for preventing rotation of said housing about the axis of said thimble while permitting longitudinal movement thereof, two take-up pulleys located within the housing and rotatable about a common axis which is spaced from the axis of the spindle and is in fixed relation to said housing, said pulleys being rotatable independently of each other and each of them being free to make more than one rotation, a flat perforated tape extending over said sprocket wheel and engaged therewith so as to be carried thereover by rotation thereof with said spindle which tape is provided with a series of markings for indicating units of measurement of said gage, said tape having its end portions coiled respectively on said pulleys in opposite directions, a single spring bodily rotatable about the axis of the pulleys and having its ends connected respectively with said pulleys and tending to rotate them in opposite winding directions, said spring upon rotation of either pulley by one portion of said tape in the unwinding direction serving to rotate the other pulley in the same direction to effect winding of the other portion of said tape thereon and further serving to rotate said other pulley at speeds varying from those of the first said pulley to compensate for varying differences in the unwinding and winding radii of the coiled portions of said tape on said pulleys, and a stationary indicator on the housing adjacent the tape so that the markings on the tape register successively therewith to provide direct readings of said micrometer gage.

4. An attachment as set forth in claim 3, wherein the axis of rotation of said take-up pulleys is at an angle to a plane through the spindle axis so that the center lines of the tape between said sprocket wheel and said pulleys are approximately in a plane perpendicular to the spindle axis and extending through the center of said sprocket wheel.

5. For use with a micrometer gage including a frame and a fixed barrel and a rotatable spindle partly within the barrel and having a threaded connection therewith and a rotatable thimble carried by the spindle and surrounding a portion of the barrel, an attachment comprising in combination, a housing separate from said frame and thimble and having two parts separated in a plane normal to the axis of said thimble and said housing parts each having first and second openings therein, a sleeve disposed in said first openings in the housing parts for free rotation therewithin which sleeve is fixedly connectible with said thimble for rotation and for longitudinal movement therewith, a sprocket wheel disposed within said housing and connected with said sleeve for rotation and for longitudinal movement therewith, means on said housing parts engaging one of said longitudinally movable parts for moving said housing longitudinally therewith, a rod fixedly connectible at one end thereof to said frame and extending into said second housing openings in the housing parts for preventing rotation of said housing about the axis of said thimble while permitting longitudinal movement thereof, a bushing disposed in said second openings and surrounding a portion of said rod, said bushing comprising two parts adapted to be fixedly connected together to hold said two housing parts in interengagement, a perforated tape extending over said sprocket wheel and engaged therewith so as to be carried thereover by rotation thereof which tape is provided with a series of markings for indicating units of measurement of said gage, two take-up pulleys disposed within said housing and engaging said tape to receive and discharge portions thereof as said portions are discharged from and supplied to said sprocket wheel, and a stationary indicator positioned on the housing so that the markings on the tape successively register therewith to provide direct readings of said micrometer gage.

References Cited in the file of this patent

UNITED STATES PATENTS

| | | |
|---|---|---|
| 518,383 | Wieland | Apr. 17, 1894 |
| 1,361,156 | Jaques | Dec. 7, 1920 |
| 1,370,310 | Gustavson | Mar. 1, 1921 |
| 1,589,462 | De Ghetto | June 22, 1926 |
| 1,795,778 | Jaques | Mar. 10, 1931 |

FOREIGN PATENTS

| | | |
|---|---|---|
| 22,663 | Great Britain | 1904 |